United States Patent [19]

Watanabe

[11] Patent Number: 5,358,274
[45] Date of Patent: Oct. 25, 1994

[54] SHOULDER ANCHOR HEIGHT ADJUSTING APPARATUS

[75] Inventor: Yasutaka Watanabe, Aichi, Japan

[73] Assignee: Kabushiki Kaisha Tokai-Rika-Denki-Seisakusho, Aichi, Japan

[21] Appl. No.: 994,997

[22] Filed: Dec. 22, 1992

[30] Foreign Application Priority Data

Dec. 26, 1991 [JP] Japan ............... 3-107454[U]

[51] Int. Cl.$^5$ ............................ B60R 22/20
[52] U.S. Cl. .................. 280/801.2; 74/89.15; 280/808
[58] Field of Search .......... 280/801 A, 801, 808; 74/89.15

[56] References Cited

U.S. PATENT DOCUMENTS

| 4,465,091 | 8/1984 | Keller | 74/89.15 |
| 4,669,283 | 6/1987 | Ingenhoven | 74/89.15 |
| 4,706,993 | 11/1987 | Tamura | 280/801 A |
| 5,165,719 | 11/1992 | Yano | 280/801 A |

FOREIGN PATENT DOCUMENTS

9114887 10/1991 World Int. Prop. O. ......... 74/89.15

Primary Examiner—Eric Culbreth
Attorney, Agent, or Firm—Sixbey, Friedman, Leedom & Ferguson

[57] ABSTRACT

A shoulder anchor height adjusting apparatus movably adjusts the height of a shoulder anchor. The shoulder anchor is attached to a slider, which is supported by a rail extending from the upper portion of the side wall of the vehicle in the vertical direction so as to be guided along the rail. Further, the slider moves in the vertical direction of the vehicle so as to move the shoulder anchor in a likewise direction. A long bolt is disposed between the slider and the rail and at the upper portion of the side wall of the vehicle. The long bolt has an axis in the vertical direction of the vehicle, and is provided so as to be rotatable about the axis. An elevator nut is screwed into the bolt, and is moved in the vertical direction of the vehicle by rotation of the bolt. An arm outwardly extends from the slider in the transverse direction of the vehicle, has a contact portion for contacting the elevator nut. The arm moves the slider in the vertical direction of the vehicle since the contact portion is pushed by the elevator nut as the elevator nut moves in the vertical direction.

20 Claims, 7 Drawing Sheets

SHOULDER ANCHOR HEIGHT ADJUSTING APPARATUS

BACKGROUND OF THE INVENTION

1. Field of the Invention

The present invention relates to a shoulder anchor height adjusting apparatus for adjusting the height of a shoulder anchor by moving the shoulder anchor through which a longitudinal intermediate portion of a webbing is inserted, at an upper portion of a side wall of a vehicle in a vertical direction of the vehicle.

2. Description of the Related Art

In a three point seat belt for securing a passenger, one end of a webbing is wound up onto a retractor which is mounted at a lower portion of a side wall of a vehicle. Further, the other end of the webbing is anchored by an anchor plate secured to the lower portion of the side wall of the vehicle through a shoulder anchor which is positioned at an upper portion of the side wall of the vehicle. A tongue plate is slidably fitted to the webbing between the shoulder anchor and the anchor plate. The tongue plate engages a buckle apparatus so that the webbing secures the passenger to the seat. The webbing between the shoulder anchor and the tongue plate forms a shoulder webbing, and the webbing between the tongue plate and the anchor plate forms a wrap webbing.

In order to adjust the shoulder webbing so as to conform to the body of the passenger, there is provided a shoulder anchor height adjusting apparatus for adjusting the height of the shoulder anchor.

Figure 7:
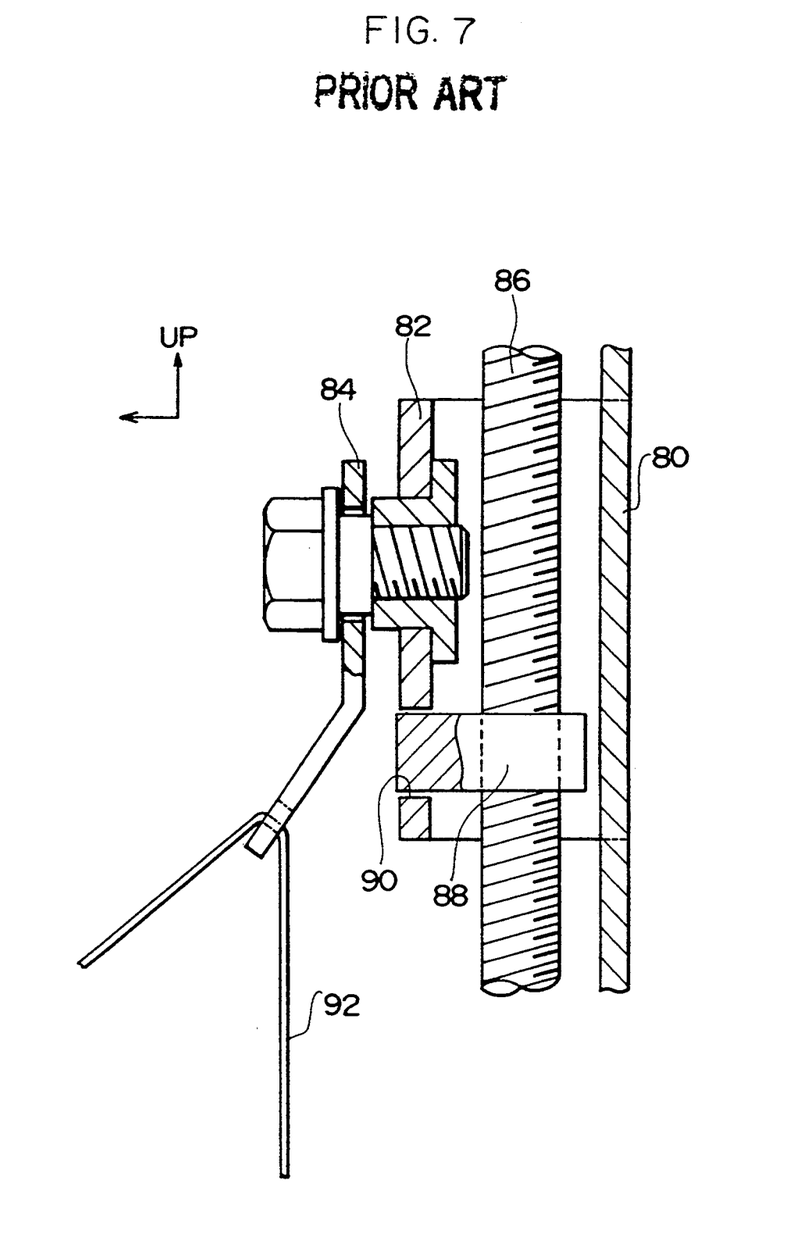
FIG. 7 is a vertical sectional view of a conventional shoulder anchor height adjusting apparatus as seen from the back of the vehicle.

In the conventional shoulder anchor height adjusting apparatus, as shown in FIG. 7 (in which an upper direction of the vehicle is shown by the arrow marked UP), a rail 80 is disposed at the upper portion of the side wall of the vehicle. A slider 82 is provided on the rail 80. A shoulder anchor 84 is attached to the slider 82. The slider 82 is moved and guided along the rail 80 in a vertical direction of the vehicle. The shoulder anchor 84 is thereby moved in the vertical direction of the vehicle. A long bolt 86 serving as a feed screw is arranged at the upper portion of the side wall of the vehicle in an outward direction with respect to the slider 82 and in a transverse direction of the vehicle so as to have the vertical direction of the vehicle as its axial direction. The long bolt 86 is screwed into a nut 88 serving as a screw member. The nut 88 inwardly extends in the transverse direction of the vehicle. The extending end of the nut 88 engages an engaging hole 90 which is opened in the slider 82. The long bolt 86 is rotated and driven by a motor so that the nut 88 is moved in the vertical direction of the vehicle. The extending end of the nut 88 pushes up or draws down the slider 82 through the engaging hole 90 of the slider 82 so as to move the slider 82 in the vertical direction of the vehicle.

In the conventional shoulder anchor height adjusting apparatus, a webbing 92 is pulled so that a load is applied to the shoulder anchor 84 when the height of the shoulder anchor 84 is adjusted after setting the webbing. The load is applied to the extending end of the nut 88 via the engaging hole 90 of the slider 82. Accordingly, in the long bolt 86, angular moment is generated about a line in a longitudinal direction of the vehicle perpendicular to an axis of the long bolt 86. Due to this angular moment, frictional resistance between the long bolt 85 and the nut 88 become larger. Consequently, a larger rotational driving force is required to rotate the long bolt 85 thereby necessitating a large-sized motor. It also becomes necessary to enhance the strength of the nut 88 and the long bolt 85.

As a result, the overall apparatus is large in size and heavy in weight making for an increase in production cost.

SUMMARY OF THE INVENTION

In view of the facts as set forth hereinbefore, it is an object of the present invention to provide a shoulder anchor height adjusting apparatus which can reduce angular moment about a line in a longitudinal direction of a vehicle perpendicular to an axis of a feed screw, reduce frictional resistance between the feed screw and a screw member, and rotate the feed screw without a large rotational force, resulting in making the overall size of the apparatus smaller, reducing the weight of the apparatus, and reducing production cost.

A shoulder anchor height adjusting apparatus of the present invention is provided to adjust the height of a shoulder anchor by moving the shoulder anchor through which a longitudinal intermediate portion of a webbing, having one end wound up by a retractor and the other end anchored by an anchor plate, passes, at an upper portion of a side wall of a vehicle in a vertical direction of the vehicle. The apparatus is provided with a rail disposed at the upper portion of the side wall of the vehicle, and extends in the vertical direction of the vehicle, a slider to which the shoulder anchor is attached, the slider supported by the rail to be guided along the rail, and moving in the vertical direction of the vehicle so as to move the shoulder anchor in the vertical direction of the vehicle, a feed screw disposed at an intermediate portion of the slider in a longitudinal direction of the vehicle and at the upper portion of the side wall of the vehicle outwardly in a transverse direction of the vehicle, having an axis in the vertical direction of the vehicle, and provided so as to be rotatable about the axis, a screw member screwed into the feed screw, and moving in the vertical direction of the vehicle by the rotation of the feed screw, and an arm device outwardly extending from the slider in the transverse direction of the vehicle, and having a contact portion for contacting the screw member. The arm device moves the slider in the vertical direction of the vehicle since the contact portion is pushed by the screw member as the screw member moves in the vertical direction of the vehicle.

According to the present invention as set forth above, when the feed screw is rotated after attaching the webbing, the screw member moves in the vertical direction of the vehicle. Consequently, the contact portion of the screwing portion contacting member is pushed by the screw member to move the slider along the rail in the vertical direction of the vehicle. Thus, the shoulder anchor is moved in the vertical direction of the vehicle and adjusted to a height suitable for conforming to the body of a passenger. At this time, since the webbing is secured to the passenger, the webbing is pulled so that the load is applied to the slider through the shoulder anchor. Further, the load is exerted onto the feed screw through the contact portion of the arm device. The contact portion of the arm device outwardly extends in the transverse direction of the vehicle so as to contact the screw member. Therefore, it is possible to reduce angular moment, which is generated in the feed screw, about a line in the longitudinal direction of the vehicle perpendicular to the axis of the feed screw. As a result, it is possible to reduce frictional resistance between the feed screw and the screw member, and to rotate the feed screw by only a small rotational force. Further, the overall apparatus can be made smaller, the weight of the apparatus can be reduced, and the production cost can be decreased.

DESCRIPTION OF THE PREFERRED EMBODIMENTS

A shoulder anchor height adjusting apparatus according to an embodiment of the present invention will be described hereinafter with reference to FIGS. 1 to 5. In the drawings, the arrow marked FR denotes a forward direction of a vehicle, the arrow marked. UP denotes an upward direction of the vehicle, and the arrow marked IN denotes an inward side in a transverse direction of the vehicle or a cabin side, respectively.

Figure 4:
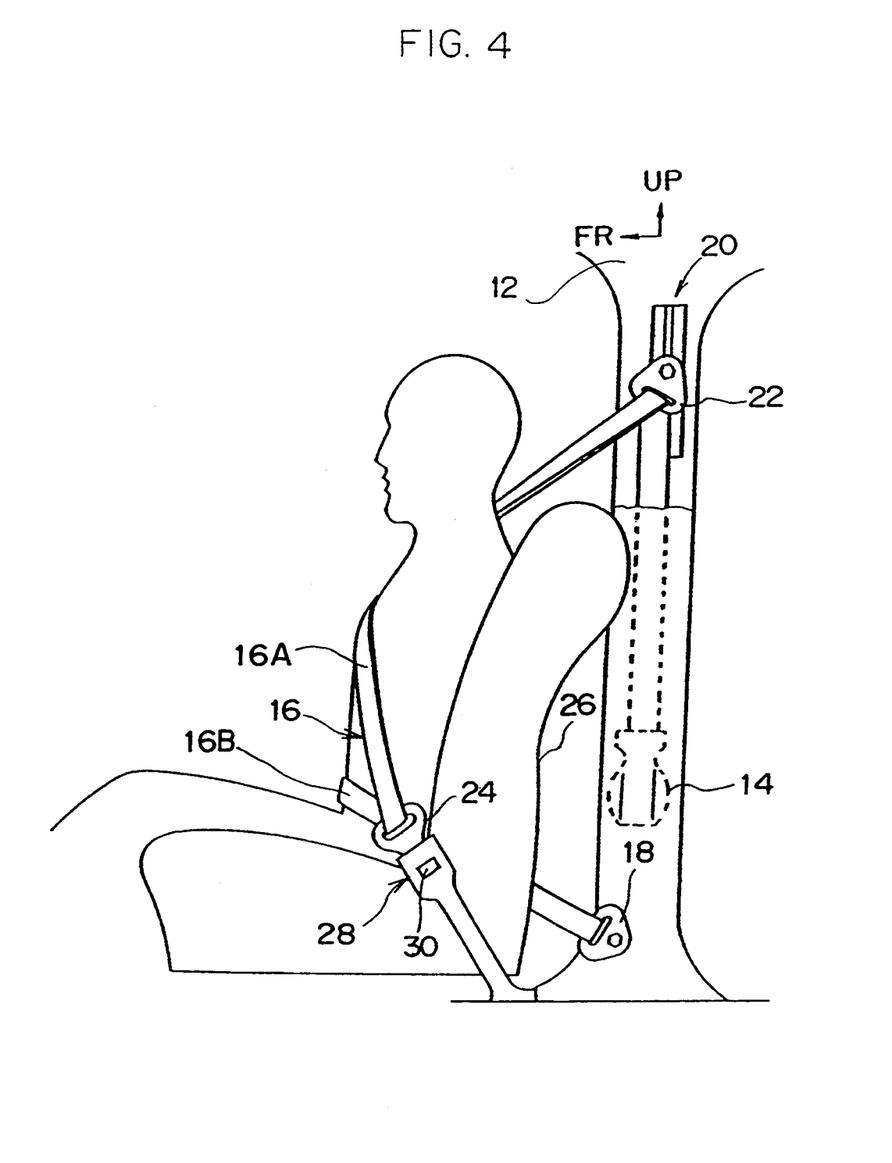
FIG. 4 is a schematic view of a three point seat belt as seen from an inward direction in the transverse direction of the vehicle.

FIG. 4 illustrates a three point seat belt apparatus. In the seat belt apparatus, a retractor 14 is disposed in a lower portion of a side wall 12 of the vehicle. One end of a webbing 16 is wound up in layered fashion by the retractor 14. An anchor plate 18 is secured to the lower portion of the side wall 12 of the vehicle at a position which is bellow the retractor 14. The other end of the webbing 16 is secured to the anchor plate 18. Further, an intermediate portion of the webbing 16 passes through the shoulder anchor 22 of the shoulder anchor height adjusting apparatus 20 and is folded. The shoulder anchor height adjusting apparatus 20 is provided at an upper portion of the side wall 12 of the vehicle. A tongue plate 24 is slidably fitted with the webbing 16 between the shoulder anchor 22 and the anchor plate 18. The tongue plate 24 removably engages a buckle apparatus 28 which is upwardly provided for a driver's seat 26 at an intermediate side inside a cabin.

When a passenger engages the tongue plate 24 with the buckle apparatus 28, the webbing is secured to the passenger. At that time, the webbing between the shoulder anchor 22 and the tongue plate 24 forms a shoulder webbing 16A, and the webbing between the tongue plate 24 and the anchor plate 18 forms a wrap webbing 16B. The sectored condition of the webbing 16 can be released by simply pushing a release button 30 of the buckle apparatus 28. The tongue plate 24 is thereby released from the buckle apparatus 28, and the webbing 16 wound up by the retractor 14.

Figure 1:
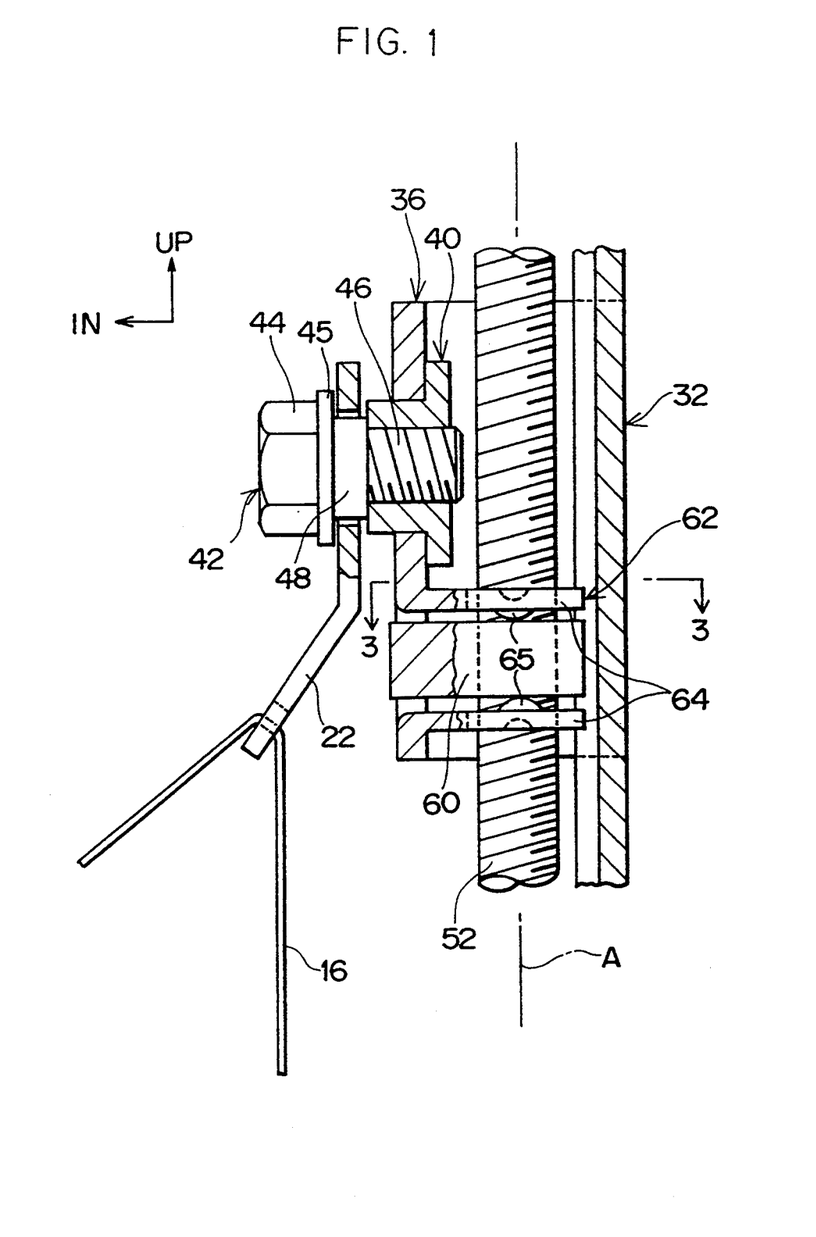
FIG. 1 is a vertical sectional view of one embodiment of a shoulder anchor height adjusting apparatus of the present invention as seen from the back of a vehicle.
Figure 2:
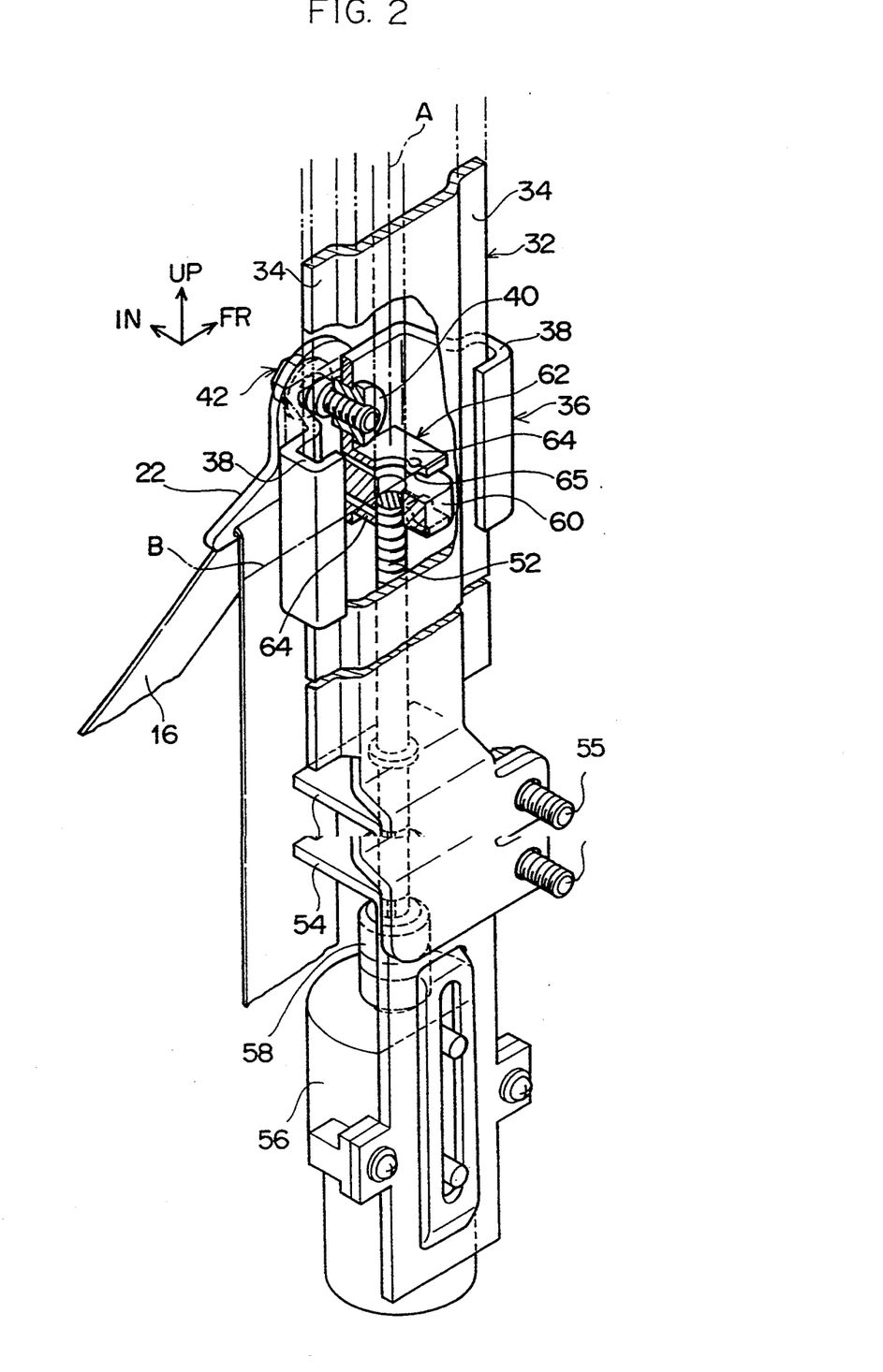
FIG. 2 is a perspective view of the embodiment of the shoulder anchor height adjusting apparatus as seen from an outward direction in a transverse direction of the vehicle.

In the shoulder anchor height adjusting apparatus 20 as shown in FIGS. 1 to 2, a rail 32 is provided at the upper portion of the side wall 12 (shown in FIG. 4) of the vehicle. The length of the long rail 32 is provided in vertical direction of the vehicle. Further, the rail 32 is provided with an intermediate portion in a longitudinal direction of the vehicle. The rectangular intermediate portion outwardly extends in the transverse direction of the vehicle as seen in the vertical direction the vehicle. The rail 32 is also provided with both sides in the longitudinal direction of the vehicle. The both sides serve as a guide strip 34 extending in the longitudinal direction of the vehicle.

A slider 36 is provided on the inward side of the rail 32 in the transverse direction of the vehicle. The slider 36 is provided with an intermediate portion in the longitudinal direction of the vehicle. The rectangular intermediate portion extends inwardly in the transverse direction of the vehicle as seen from the vertical direction of the vehicle. Further, the slider 36 is provided with both sides in the longitudinal direction of the vehicle. The both sides serve as a rectangular supporting strip 38 opposed to the guide strip 34 of the rail 32 as seen in the vertical direction of the vehicle. The supporting strip 38 movably engages the guide strip 34, and is guided by the guide strip 34. The slider 36 can be thereby slid and moved along the rail 32 in the vertical direction of the vehicle.

An anchor nut 40 having a flange is provided on the slider 36 at an intermediate portion of the slider 36 in the longitudinal direction of the vehicle. The anchor nut 40 is provided with its axial direction as the transverse direction of the vehicle. A distal end of the anchor nut 40 passes through the slider 36, and extends inwardly of the vehicle.

An anchor bolt 42 is fixedly screwed into the anchor nut 40 from an outward direction in the transverse direction of the vehicle. The anchor bolt 42 is provided with a head portion 44 having a flange. Further, the anchor bolt 42 is provided with an intermediate stage portion 48 whose size is between a diameter of the flange 45 of the head portion 44 and a diameter of the male screw portion 46. The shoulder anchor 22 is fitted around an outer periphery of the intermediate stage portion 48. Thus, the shoulder anchor 22 is held between the head portion 44 having the flange and a distal end surface of the anchor nut 40.

Figure 3:
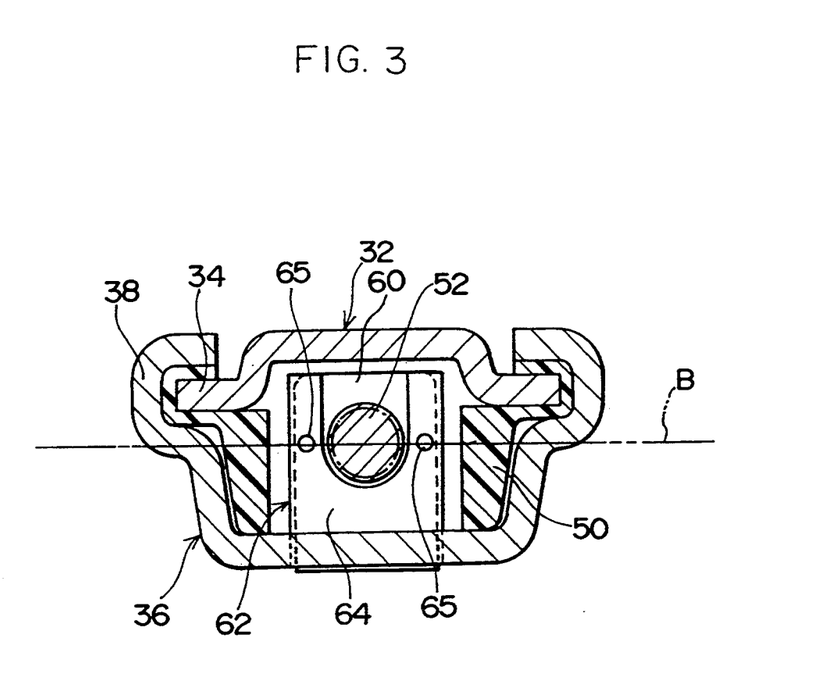
FIG. 3 is a sectional view taken along the line 3—3 of FIG. 1.

In the slider 36, a shoe member 50 is interposed and fixed between the slider 36 and the rail 32 as shown in FIG. 3. Smooth sliding movement of the slider 36 can be ensured by the shoe member 50.

A long bolt 52 forming a feed screw is outwardly provided in the transverse direction of the vehicle at the intermediate portion of the slider 36 in the longitudinal direction of the vehicle. The long bolt 52 is arranged between slider 36 and the rail 32, and is provided in the vertical direction of the vehicle as an axial direction of the long bolt 52. The respective upper and lower ends of the long bolt 52 pass through and are supported by L-shaped supporting plates 54 (only one supporting plate 54 at a lower end of the rail 32 is shown) extending inwardly in the transverse direction of the vehicle at the respective upper and lower ends of the rail 32. The long bolt 52 is rotatable about an axis of the long bolt 52. The supporting plate 54 and the rail 32 are secured by a bolt 55 to the side wall 12 of the vehicle.

The lower end of the long bolt 52 is connected via a joint 58 to a motor 56 which is secured to the supporting plate 54 disposed at the lower end of the rail 32. The long bolt 52 is forwardly or reversely rotated by the driving of the motor 56. The motor 56 is operated by an operating switch provided in, for example, an unillustrated arm rest.

The long bolt 52 is screwed into an elevator nut 60 which forms a screw member. The elevator nut 60 is provided in a rectangular form as seen from the vertical direction of the vehicle. The rotation of the elevator nut 60 generated by the rotation of the long bolt 52 is restricted by the end of the elevator nut 60 in the transverse direction of the vehicle which is in contact with the rail 32. Accordingly, the elevator nut 60 is movable only in the vertical direction of the vehicle as the long bolt 52 is rotated.

On the other hand, an arm 62 is provided at a lower portion of the slider 36 in the vertical direction of the vehicle. The arm 62 extends outwardly in the transverse direction of the vehicle from the intermediate portion of the slider 36 in the longitudinal direction of the vehicle. The arm 62 includes a pair of arm pieces 64 which is positioned so as to sandwich the elevator nut 60 therebetween. The respective arm pieces 64 are provided in a substantially rectangular form as seen from the vertical direction of the vehicle. The arm pieces 64 extend from both sides of the long bolt 52 in the longitudinal direction of the vehicle so as not to be in contact with the long bolt 52. Distal ends of the respective arm pieces 64 are formed with contact portions for contacting upper and lower surfaces of the elevator nut 60. The contact portion includes a spherically extending projection 65. The spherical projection 65 is positioned on a line B in the longitudinal direction of the vehicle perpendicular to an axis A of the long bolt 52.

The operation of the embodiment will now be described.

As shown in FIG. 4, the webbing 16 can be secured to the passenger after the passenger has sat on the seat 26 by simply engaging the tongue plate 24 with the buckle apparatus 28. Thus, the webbing of the three point seat belt apparatus can be obtained.

An unillustrated operating switch is then operated to move the elevator nut 60 in the vertical direction of the vehicle so as to adjust the height of the shoulder anchor 22 so as to conform to the body of a passenger. When the elevator nut 60 is moved, the spherical projection 65 of the arm 62 is pushed by the elevator nut 60 so that the slider 36 is moved in the vertical direction of the vehicle. Thus, the shoulder anchor 22 is moved in the vertical direction of the vehicle to appropriately adjust the height of the shoulder anchor 22.

At this time, the webbing 16 is pulled to secure it to the passenger. The resulting load is applied to the slider 36 thorough the shoulder anchor 22. The load is then exerted to the elevator nut 60 through the spherical projection 65 of the arm 62 which in turn exerts the load onto the long bolt 52. When the load is exerted onto the arm 62, the arm 62 is moved in the transverse direction of the vehicle. The spherical projection 65 then comes in contact with the elevator nut 60. Accordingly, this reduces the angular moment to the long bolt 52 about the line B in the longitudinal direction of the vehicle perpendicular to the axis A of the long bolt 52.

Therefore, it is possible to reduce frictional resistance between the long bolt 52 and the elevator nut 60, and to rotate the long bolt 52 by only a small rotational force.

As a result, the overall apparatus can be made smaller, the weight of the apparatus can be decreased, and the production cost can be reduced.

Figure 5:
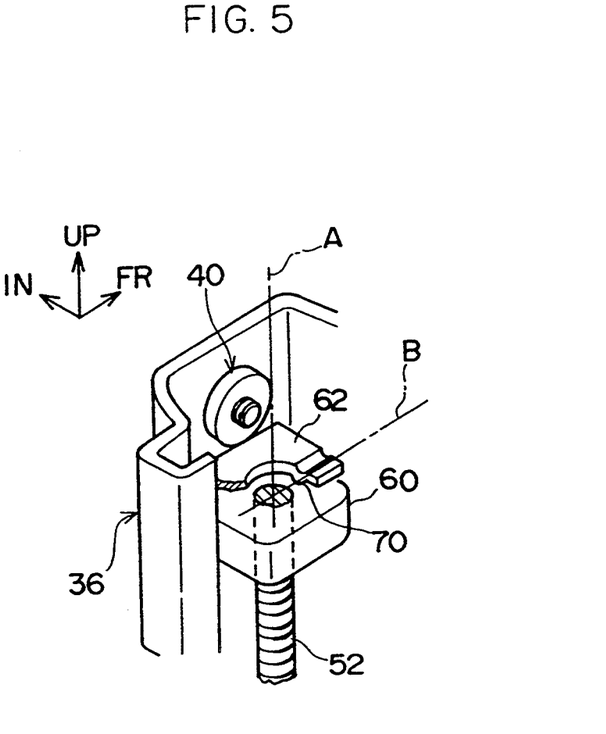
FIG. 5 is a perspective view of the embodiment of the shoulder anchor height adjusting apparatus with a contacting member which is formed in another configuration.
Figure 6:
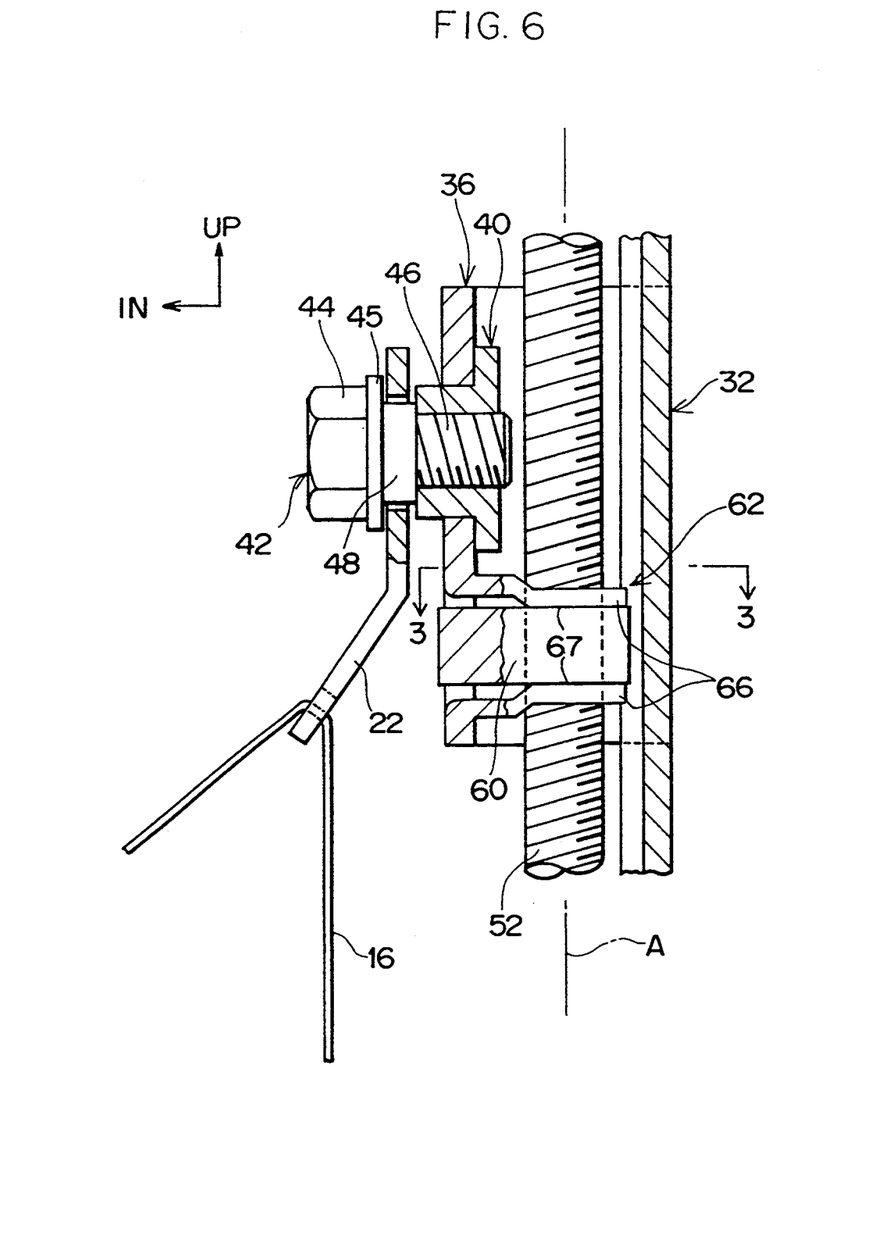
FIG. 6 is a vertical sectional view of another configuration of the contact portion of the shoulder anchor height adjusting apparatus according to the embodiment as seen from the back of the vehicle.

It must be noted that the present invention should not be limited to this embodiment. Various modifications may be made. For example, though the contact portion is a spherically extending projection 65 in the embodiment, the contact portion may be a cylindrical surface projection 70 having the longitudinal direction of the vehicle as its axial direction as shown in FIG. 5. Further, the contact portion may employ a surface contact such as a surface contact projection 66 about the line B in the longitudinal direction of the vehicle as shown in FIG. 6, instead of a point contact such as the spherical projection 65 contacting the elevator nut 60 or a line contact such as the cylindrical surface projection 70 and the elevator nut 60. That is, it is essential only to bring the contact portion into contact with the elevator nut 60 at a position outwardly extending from the slider 36 in the transverse direction of the vehicle. It is assumed that the spherical projection 65 which is in point contact on the line B in the longitudinal direction of the vehicle perpendicular to the axis A of the long bolt 52, and the cylindrical surface projection 70 which is in line contact on the line B in the longitudinal direction of the vehicle perpendicular to the axis A of the long bolt 52 will be employed. In this case, the arm 62 will be deflected about a main end connected to the slider 36 due to a load when the vehicle rapidly decelerates. The deflection may be accompanied by a deviation of the position where the contact portion contacts the elevator nut 60 in the transverse direction of the vehicle from the line B in the longitudinal direction of the vehicle perpendicular to the axis A of the long bolt 52. However, the deviation will not be very large, so it will be possible to minimize the moment generated about the line B in the longitudinal direction of the vehicle.

In the above embodiment, the arm 62 is integrally provided with the slider 36. However, a separate arm may be secured to the slider 36.

Further, in the above embodiment, the long bolt 52 is rotated by the drive of a motor drive. However, the long bolt 52 may be manually rotated.

What is claimed is:

1. A shoulder anchor height adjusting apparatus for adjusting a height of a shoulder anchor by moving said shoulder anchor through which a longitudinal intermediate portion of a webbing having one end would up by a retractor and the other end anchored by an anchor plate passes, at an upper portion of a side wall of a vehicle in a vertical direction of said vehicle, said apparatus comprising:

a rail disposed at said upper portion of said side wall of said vehicle, and extending in the vertical direction of said vehicle;

a slider to which said shoulder anchor is attached, said slider supported by said rail so as to be guided along said rail, and moving in the vertical direction of said vehicle so as to move said shoulder anchor in the vertical direction of said vehicle;

a feed screw disposed further towards an outer side of said vehicle in a transverse direction of said vehicle than an intermediate portion of said slider in a longitudinal direction of said vehicle and disposed at said upper portion of said side wall of said vehicle, having an axis in the vertical direction of said vehicle, and provided so as to be rotatable about said axis;

a screw member screwed into said feed screw, and movable in the vertical direction of said vehicle by rotation of said feed screw; and arm means including a pair of arm pieces outwardly extending from said slider in the transverse direction of said vehicle for reducing an angular moment applied to said feed screw and said screw member, said arm pieces being provided respectively on an upper side and a lower side of said elevator nut in the vertical direction of said vehicle, said arm pieces moving said slider in the vertical direction of said vehicle when said contact portion is pushed by said screw member as said screw member moves in the vertical direction of said vehicle, and an elongated contact projection disposed between each of said arm pieces and said elevator nut for contacting said arm pieces and said elevator nut.

2. A shoulder anchor height adjusting apparatus according to claim 1, wherein said contact projection includes at least one surface contact projection which is provided on one of said arm pieces and said screw member on a line extending along the longitudinal direction of said vehicle and on a line intersecting said axis of said feed screw, and is provided so as to be in substantial surface contact with said screw member.

3. A shoulder anchor height adjusting apparatus according to claim 1, wherein said pair of arm pieces is respectively provided in a substantially rectangular form as seen from the vertical direction of said vehicle, and are spaced from said feed screw.

4. A shoulder anchor height adjusting apparatus according to claim 1, further comprising shoe means disposed between said rail and said arm means to operatively contact therebetween.

5. A shoulder anchor height adjusting apparatus according to claim 4, wherein said screw means is operatively contacted with said shoe means which is disposed so as to surround said screw member.

6. A shoulder anchor height adjusting apparatus according to claim 1, wherein each of said elongated contact projections provides line contact between said screw member and said arm pieces on a line extending along the longitudinal direction of said vehicle and on a line intersecting said axis of said feed screw.

7. A shoulder anchor height adjusting apparatus according to claim 6, wherein each of said elongated contact projections is arcuate in a transverse cross sectional view.

8. A shoulder anchor height adjusting apparatus according to claim 1, wherein said feed screw is provided between said intermediate portion of said slider in the longitudinal direction of said vehicle and said rail.

9. A shoulder anchor height adjusting apparatus according to claim 1, wherein said screw member is provided with a slider contact portion inwardly in the transverse direction of said vehicle, said slider contact portion being provided so as to enable contact with said slider, and prevent said slider from rotating about said axis of said feed screw by contacting said slider.

10. A shoulder anchor height adjusting apparatus for adjusting a height of a shoulder anchor by moving said shoulder anchor through which a longitudinal intermediate portion of a webbing having one end would up by a retractor and the other end anchored by an anchor plate passes, at an upper portion of a side wall of a vehicle in a vertical direction of said vehicle, said apparatus comprising:

a rail disposed at said upper portion of said side wall of said vehicle, and extending in the vertical direction of said vehicle;

a slider having an intermediate portion in a longitudinal direction of said vehicle provided the inward side of said rail in a transverse direction of said vehicle, said slider to which said shoulder anchor is attached, being supported by said rail so as to be guided along said rail, and moving in the vertical direction of said vehicle so as to move said shoulder anchor in the vertical direction of said vehicle;

a bolt disposed between said slider and said rail and at said upper portion of said side wall of said vehicle, having an axis in the vertical direction of said vehicle, and provided so as to be rotatable about said axis;

an elevator nut screwed into said bolt, and moving in the vertical direction of said vehicle by rotation of said bolt; and a pair of arm pieces outwardly extending from said slider in the transverse direction of said vehicle, each of said pair of arm pieces being provided respectively on an upper side and a lower side of said elevator nut in the vertical direction of said vehicle, and each of said pair of arm pieces having a contact projection for contacting said elevator nut, said pair of arm pieces moving said slider in the vertical direction of said vehicle when said contact projection is pushed by said elevator nut as said elevator nut moves in the vertical direction of said vehicle to reduce an angular moment caused to said feed screw through said webbing and to reduce frictional resistance between said feed screw and said screw member.

11. A shoulder anchor height adjusting apparatus according to claim 10, wherein said contact projection is at least one spherical surface projection which is provided on a line extending along the longitudinal direction of said vehicle and on a line intersecting said axis of said bolt, and is provided so as to be in a substantial point contact with said elevator nut.

12. A shoulder anchor height adjusting apparatus according to claim 10, wherein said projection is cylindrical and is provided on a line extending along the longitudinal direction of said vehicle and on a line intersecting said axis of said bolt, and is provided so as to be in substantial line contact with said elevator nut along said line;

13. A shoulder anchor height adjusting apparatus according to claim 10, wherein said contact projection is at least one surface contact projection which is provided on a line extending along the longitudinal direction of said vehicle and on a line intersecting said axis of said bolt, and is provided so as to be in substantial surface contact with said elevator nut.

14. A shoulder anchor height adjusting apparatus according to claim 10, wherein said pair of arm pieces is respectively provided in a substantially rectangular form as seen from the vertical direction of said vehicle, and are spaced from said bolt.

15. A shoulder anchor height adjusting apparatus according to claim 10, wherein said elevator nut is provided with a slider contact portion inwardly in the transverse direction of said vehicle, said slider contact portion being provided so as to enable contact of said slider contact portion with said slider, and prevent said slider from rotating about said axis of said bolt by contacting said slider.

16. A shoulder anchor height adjusting apparatus according to claim 10, wherein said pair of arm pieces is integrally provided with said slider.

17. A shoulder anchor height adjusting apparatus according to claim 10, wherein said pair of arm pieces is assembled to said slider.

18. A shoulder anchor height adjusting apparatus according to claim 10, wherein said slider has a shoe member between said slider and said rail, said shoe member contacting said rail for providing smooth movement of said slider in the vertical direction of said vehicle.

19. A shoulder anchor height adjusting apparatus according to claim 18, wherein said elevator nut is operatively contacted with said shoe member which is disposed so as to surround said elevator nut.

20. A shoulder anchor height adjusting apparatus according to claim 10 further comprising:
a driving means coupled to one end of said bolt for rotating said bolt.

* * * * *